US008151352B1

(12) United States Patent
Novitchi

(10) Patent No.: US 8,151,352 B1
(45) Date of Patent: Apr. 3, 2012

(54) ANTI-MALWARE EMULATION SYSTEMS AND METHODS

(75) Inventor: Mihai Novitchi, Bucharest (RO)

(73) Assignee: Bitdefender IPR Managament Ltd., Nicosia (CY)

( * ) Notice: Subject to any disclaimer, the term of this patent is extended or adjusted under 35 U.S.C. 154(b) by 1350 days.

(21) Appl. No.: 11/486,803

(22) Filed: Jul. 14, 2006

(51) Int. Cl.
| | |
|---|---|
| G06F 11/00 | (2006.01) |
| G06F 12/14 | (2006.01) |
| G06F 12/16 | (2006.01) |
| G06F 9/45 | (2006.01) |
| G08B 23/00 | (2006.01) |

(52) U.S. Cl. .................... 726/24; 726/22; 717/138
(58) Field of Classification Search .............. 726/22, 726/24; 703/26; 717/134
See application file for complete search history.

(56) References Cited

U.S. PATENT DOCUMENTS

| | | | |
|---|---|---|---|
| 5,398,196 A | | 3/1995 | Chambers |
| 5,454,086 A | | 9/1995 | Alpert et al. |
| 5,765,030 A | | 6/1998 | Nachenberg et al. |
| 5,826,013 A | | 10/1998 | Nachenberg |
| 5,896,522 A | * | 4/1999 | Ward et al. ................... 703/23 |
| 5,930,495 A | * | 7/1999 | Christopher et al. ........... 703/26 |
| 5,964,889 A | * | 10/1999 | Nachenberg ................... 714/25 |
| 5,999,723 A | * | 12/1999 | Nachenberg ................... 703/22 |
| 6,275,938 B1 | * | 8/2001 | Bond et al. ..................... 726/23 |
| 6,338,141 B1 | | 1/2002 | Wells |
| 6,357,008 B1 | * | 3/2002 | Nachenberg ................... 726/24 |
| 6,775,780 B1 | | 8/2004 | Muttik |
| 6,851,057 B1 | * | 2/2005 | Nachenberg ................... 726/24 |
| 6,851,058 B1 | | 2/2005 | Gartside |
| 6,941,478 B2 | * | 9/2005 | Card et al. ..................... 726/24 |
| 6,968,461 B1 | | 11/2005 | Lucas et al. |
| 6,973,577 B1 | | 12/2005 | Kouznetsov |
| 6,981,279 B1 | * | 12/2005 | Arnold et al. .................. 726/22 |
| 7,013,483 B2 | * | 3/2006 | Cohen et al. ................... 726/25 |
| 7,251,830 B1 | * | 7/2007 | Melchione ..................... 726/24 |
| 7,363,506 B2 | * | 4/2008 | Carbone ....................... 713/188 |
| 7,367,057 B2 | * | 4/2008 | Das et al. ....................... 726/24 |
| 7,370,360 B2 | * | 5/2008 | van der Made ................ 726/24 |
| 7,409,718 B1 | * | 8/2008 | Hong et al. .................... 726/24 |

(Continued)

OTHER PUBLICATIONS

Bitdefender, "Bitdefender Launches Next Generation of Heuristic Detection," dated May 2, 2006, downloaded on May 11, 2006 from http://www.tmcnet.com/usubmit/2006/05/02/1630653.htm.

(Continued)

Primary Examiner — Emerson Puente
Assistant Examiner — Charles Swift
(74) Attorney, Agent, or Firm — Law Office of Andrei D Popovici, PC

(57) ABSTRACT

In some embodiments, antivirus/malware behavior-based scanning (emulation) is accelerated by identifying known code sequences and executing pre-stored native-code routines (e.g. decompression, decryption, checksum routines) implementing the functionality of the known code sequences before returning to the emulation. During emulation, target machine code instructions are compared to a set of known signatures. If a known code sequence is identified, the emulator calls a native code routine and caches the current instruction address. If the emulator subsequently reaches a cached address, a native code routine may be called without scanning the data at the address for known signatures. Signature scanning may be performed selectively for instructions following code flow changes (e.g. after jump, call or interrupt instructions). The emulator may also call native-code routines implementing virtual operating system calls, and native-code unpacked file reconstruction routines that reconstruct unpacked files from the contents of virtual memory for scanning by a content-based malware scanner.

27 Claims, 3 Drawing Sheets

U.S. PATENT DOCUMENTS

| | | | |
|---|---|---|---|
| 7,590,982 B1* | 9/2009 | Weissman | 718/1 |
| 7,624,449 B1* | 11/2009 | Perriot | 726/24 |
| 7,644,441 B2* | 1/2010 | Schmid et al. | 726/24 |
| 7,657,419 B2* | 2/2010 | van der Made | 703/22 |
| 7,739,100 B1* | 6/2010 | Muttik et al. | 703/26 |
| 7,908,653 B2* | 3/2011 | Brickell et al. | 726/22 |
| 7,996,905 B2* | 8/2011 | Arnold et al. | 726/24 |
| 2002/0138766 A1* | 9/2002 | Franczek et al. | 713/201 |
| 2003/0159090 A1* | 8/2003 | Wray et al. | 714/38 |
| 2003/0212902 A1* | 11/2003 | van der Made | 713/200 |
| 2004/0015712 A1* | 1/2004 | Szor | 713/200 |
| 2004/0068662 A1 | 4/2004 | Ho et al. | |
| 2004/0068664 A1* | 4/2004 | Nachenberg et al. | 713/200 |
| 2004/0255165 A1* | 12/2004 | Szor | 713/201 |
| 2005/0091558 A1 | 4/2005 | Chess et al. | |
| 2005/0188272 A1 | 8/2005 | Bodorin et al. | |
| 2005/0268338 A1 | 12/2005 | Made | |
| 2006/0021041 A1* | 1/2006 | Challener et al. | 726/24 |
| 2006/0123244 A1* | 6/2006 | Gheorghescu et al. | 713/188 |
| 2006/0200863 A1* | 9/2006 | Ray et al. | 726/24 |
| 2007/0136811 A1* | 6/2007 | Gruzman et al. | 726/24 |
| 2008/0005796 A1* | 1/2008 | Godwood et al. | 726/24 |

OTHER PUBLICATIONS

ESET, "ThreatSense(R) Technology," downloaded on May 10, 2006 from http://www.eset.com/products/threatsense.php.

Virusblockada (VBA), "Vba32 Personal," downloaded on May 10, 2006 from http://www.anti-virus.by/en/personal.html.

Novitchi, Mihai; Declaration submitted under 37 CFR 1.56, dated Feb. 8, 2012.

* cited by examiner

ANTI-MALWARE EMULATION SYSTEMS AND METHODS

BACKGROUND

The invention relates to systems and methods for detecting viruses and other malware, and in particular to anti-virus detection systems using behavior-based heuristics.

Known methods of scanning for malicious software (malware) such as viruses, worms, and Trojan horses include content-based methods and behavior-based methods. In content-based methods, the contents of a suspected file are compared to a database of known malware signatures. If a known virus signature is found in the suspected file, the file is labeled as a virus. Content-based methods are generally effective at identifying known malware, but may not be able to identify new threats. Also, malware writers often employ countermeasures aimed at evading signature scanners. For example, polymorphic viruses mutate periodically in order to make their identification more difficult.

Behavior-based methods typically involve allowing a suspected program to execute in an isolated virtual environment, commonly called a sandbox, and observing the program's resulting behavior. Programs that exhibit malicious behavior are identified and removed or contained. While conventional behavior-based methods may be effective in identifying new threats, such methods may be relatively computationally intensive and require relatively long analysis times.

SUMMARY

According to one aspect, a malware detection method comprises performing an accelerated emulation of an untrusted computer file by emulating a first code sequence of the untrusted computer file in a virtual environment; and, upon identifying a known code sequence in the untrusted computer file, executing a native-code routine functionally implementing the known code sequence. A result of the accelerated emulation is used to determine whether the untrusted computer file is malicious.

According to another aspect, a malware detection method comprises: upon identifying a known code sequence in an untrusted computer file, executing a native code routine functionally implementing the known code sequence; employing a result of said executing the native code routine to emulate a second code sequence of the untrusted computer file; and determining whether the untrusted computer file is malicious according to a result of emulating the second code sequence.

According to another aspect, a malware detection method comprises determining whether a part of an untrusted computer file matches a known code signature; and when the part matches the known code signature, natively executing a native code routine functionally implementing the part, and when the part does not match the known code signature, emulating the part in a virtual machine.

According to another aspect, a malware detection method comprises emulating a first code sequence of an untrusted computer file in a virtual environment; upon identifying a virtual environment operating system call generated by said emulating the first code sequence, executing a native code routine functionally implementing the virtual environment system call; employing a result of said executing the native-code routine to emulate a second code sequence of the untrusted computer file; and determining whether the untrusted computer file is malicious according to a result of emulating the second code sequence.

According to another aspect, a malware detection method comprises emulating an unpacking of an untrusted computer file in a virtual environment to generate an unpacked content in a virtual memory of the virtual environment; executing a native code file reconstruction routine to assemble a reconstructed file on a real host of the virtual environment from the unpacked content in the virtual memory; and examining a content of the reconstructed file to determine whether the untrusted computer file is malicious.

According to another aspect, a malware detection system comprises an emulator configured to emulate an untrusted computer file in a virtual environment, and to recognize a known code sequence in the untrusted computer file; and a native-code acceleration routine responsive to the emulator and functionally implementing the known code sequence. The emulator calls the native-code acceleration routine upon recognizing the known code sequence, receives a result of an execution of the native-code acceleration routine, and employs the result of the execution to continue an emulation of the untrusted computer file.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. The term "native code" refers to code running on a real host machine, and is distinct from code running on a virtual machine defined by an emulator. Computer readable media encompass storage media such as magnetic, optic, and semiconductor media (e.g. hard drives, optical disks, flash memory, DRAM), as well as communications links such as conductive cables and fiber optic links. According to some embodiments, the present invention provides, inter alia, computer systems programmed to perform the methods described herein, as well as computer-readable media encoding instructions to perform the methods described herein.

The following description illustrates embodiments of the invention by way of example and not necessarily by way of limitation.

Figure 1:
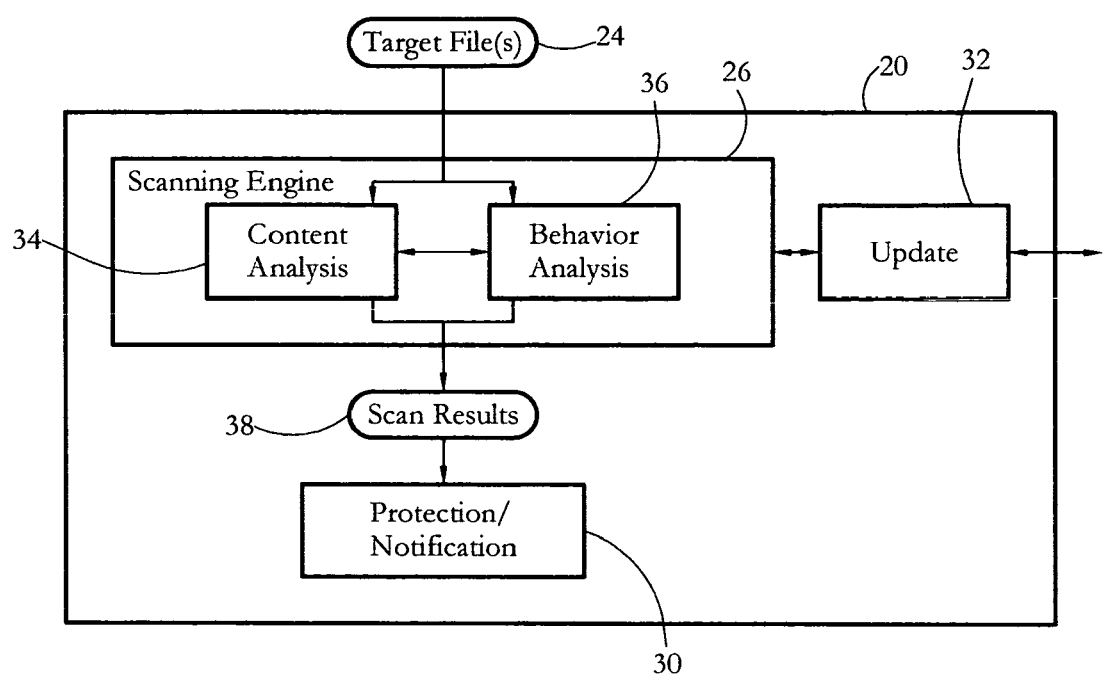
FIG. 1 shows an exemplary malware detection system according to some embodiments of the present invention.

FIG. 1 shows an anti-malware detection/protection system 20 according to some embodiments of the present invention. System 20 includes a scanning engine 26, a protection/notification module 30 connected to scanning engine 26, and an update module 32 connected to scanning engine 26. Scanning engine 26 includes a content analyzer 34 and a behavior analyzer 36.

Analyzers 34, 36 receive one or more untrusted target files 24, analyze the files, and generate a set of scan results 38. Target files 24 may include contents of an email or other electronic messages, and/or contents of one or more drives or folders to be scanned for malware. Target files 24 may include executable (e.g. portable executable, .exe., .cmd), batch (.bat), archive (e.g. .zip, .tar), script (e.g. Javascript, Visual Basic Script), and other content capable of malicious functionality. Content analyzer 34 analyzes a content of target files 24, and behavior analyzer 36 analyzes a behavior of target files 24. Scan results 38 include indicators of whether target files 24 are malicious and, for malicious files, the type of threat posed by target files 24. Protection/notification module 30 uses scan results 38 to take appropriate protection and notification steps if target files 24 are determined to be malicious. Protective actions may include removing and/or quarantining malicious files, while notification actions may include notifying a user of the type of malicious content that has been identified. Update module 32 may periodically update a set of content signatures used by content analyzer 34 and/or a set of behavior evaluation parameters used by behavior analyzer 36.

In some embodiments, anti-malware protection system 20 may be provided on end-user client computers running an operating system such as Windows, Macintosh or Linux. Anti-malware protection system 20 may be provided as part of a security suite. In some embodiments, anti-malware protection system 20 may be provided on a mail server or other external server. A malware protection system provided on a server may be used to identify malware present in emails or other messages sent to multiple clients, and to take appropriate action (e.g. remove or quarantine) before the messages are delivered to the clients.

Figure 2:
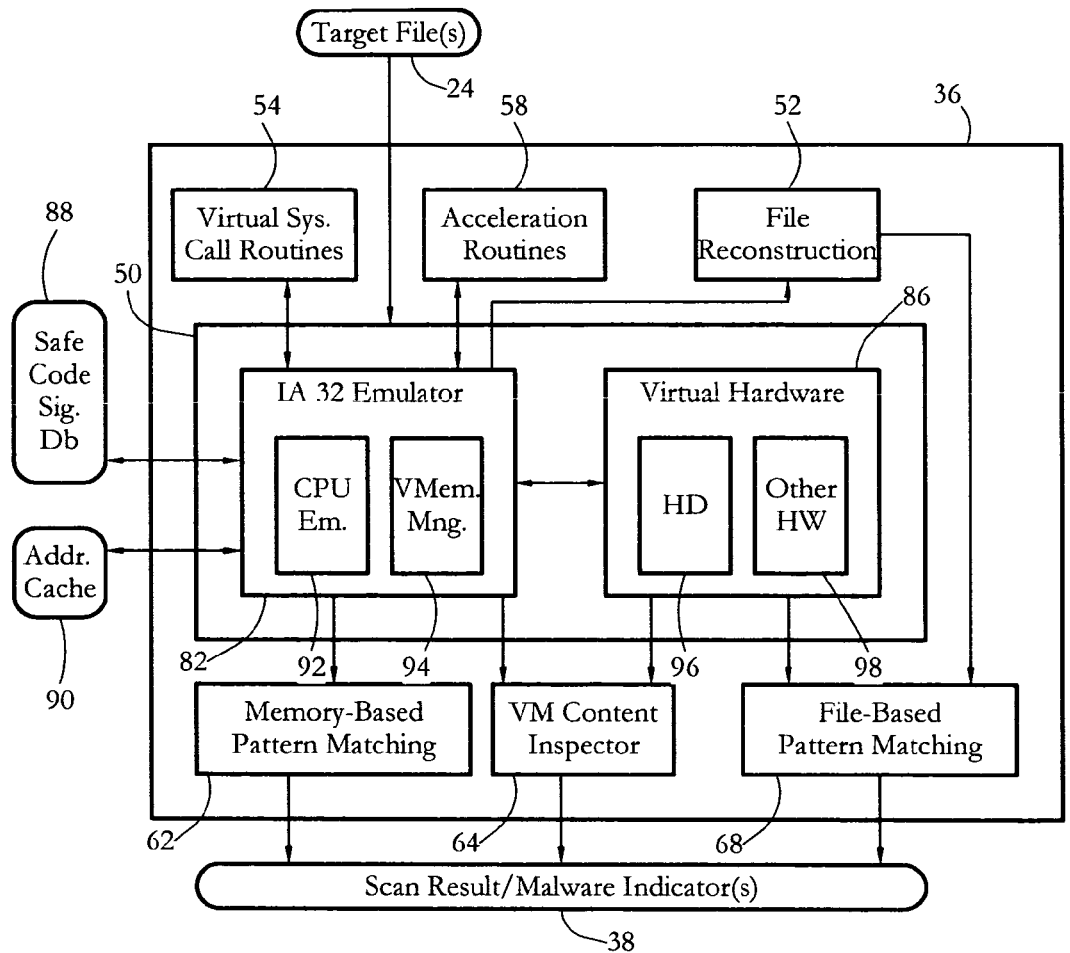
FIG. 2 shows a behavior analyzer of the system of FIG. 1 according to some embodiments of the present invention.

FIG. 2 is a diagram of behavior analyzer 36 according to some embodiments of the present invention. Behavior analyzer 36 receives a target file 24 and analyzes the behavior of target file 24 to generate a set of scanning results/malware indicators 38 indicating whether target file 24 is malicious, and a type of threat posed by target file 24. Behavior analyzer 36 includes a simulation engine 50, and a plurality of native-code routines connected to simulation engine 50: a set of native-code emulation-acceleration routines 58, a set of native-code unpacked file reconstruction routines 52, a set of native-code virtual system call routines 54, and a set of content inspection modules 62, 64, 68. The set of content inspection modules includes a virtual machine content inspector 62, a memory-based pattern matching module 64, and a file-based pattern-matching module 68.

Simulation engine 50 forms a virtual host computer for target file 24. Simulation engine 50 may be thought of as a sandbox, in which target file 24 is allowed to play and possibly harm the virtual computer created by simulation engine 50, without harming the real computer hosting simulation engine 50. Simulation engine 50 includes a system emulator 82 and a virtual hardware emulator 86 connected to system emulator 82. System emulator 82 includes a processor emulator 92 and a virtual memory controlled by a virtual memory manager 94. Virtual hardware emulator 86 includes a virtual hard drive 96 and other virtual hardware 98. Virtual hardware 98 may include a virtual display, keyboard, mouse and floppy drive. In some embodiments, system emulator 82 is configured to emulate an IA-32 (x86-32) instruction-architecture, protected-mode microprocessor and associated memory. In protected mode, different programs are generally prevented from corrupting one another. In some embodiments, system emulator 82 may be configured to emulate a real-mode microprocessor or a processor using other instruction architectures.

Each acceleration routine 58 implements in native code the algorithmic functionality of a corresponding known, safe code sequence encountered by simulation engine 50, or of a class of known code sequences having identical functionality. In general, the corresponding native-code routine's machine code need not be identical to the machine code of the known code sequence processed by the emulator, although the machine code sequences may be identical. In some embodiments, acceleration routines 58 include routines that are commonly encountered in malware scans and whose emulation is relatively computationally-intensive and time-consuming. In some embodiments, the set of acceleration routines 58 includes decompression, decryption, and/or checksum routines.

Each native-code unpacked file reconstruction routine 52 reconstructs a real file from the contents of the virtual memory of system emulator 82 following an unpacking of the file by system emulator 82. When system emulator 82 has unpacked a file in virtual memory, system emulator 82 calls an unpacked-file reconstruction routine 52, which receives the unpacked data from the virtual memory and assembles the data into a file for scanning by file-based pattern scanning module 68. In some embodiments, when system emulator 82 processes a packed file, system emulator 82 proceeds through a set of unpacking instructions. The original entry point of the packed file is a target of a code flow change. When reaching the original entry point of the packed file, system emulator 82 checks for a signature as described below, and upon finding a signature match calls an unpacked file reconstruction routine 52.

Each virtual system call routine 54 implements in native code a corresponding virtual operating system call of system emulator 82, or part of a virtual operating system call. For example, the set of virtual system call routines 54 may implement in native code the functions of a set of dynamic link libraries (DLLs) employed by system emulator 82. Upon encountering a recognized system call during emulation, system emulator 82 calls a corresponding native-code virtual system call routine 54, and receives the results of the virtual system call from the called native-code routine 54, rather than by emulating the virtual system call.

System emulator 82 is capable of accessing, (reading and updating) a known safe code signature database 88 maintained on the real host computer, as described in detail below. Each entry in safe-code signature database 88 includes a safe-code signature uniquely identifying a corresponding safe code sequence, and an identifier of a corresponding routine selected from acceleration routines 58 and unpacked file reconstruction routines 52.

Figure 3:
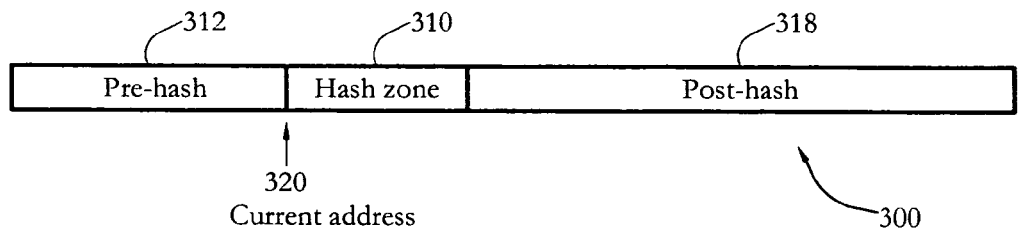
FIG. 3 shows an exemplary structure of a code signature used to determine whether to emulate a target code sequence or execute a native code sequence implementing the functionality of the target code sequence, according to some embodiments of the present invention.

FIG. 3 shows an exemplary safe code signature 300 according to some embodiments of the present invention. Signature 300 represents a sequence of bytes stored in database 88. Signature 300 identifies a known safe code area, and is searched by system emulator 82 to determine whether to call a native-code routine (an acceleration routine 58 or file reconstruction routine 52 (FIG. 2)). Signature 300 includes a hash zone 310 beginning at a starting address 320, a pre-hash zone 312 immediately preceding hash zone 310, and a post-hash zone 318 immediately subsequent to hash zone 310. Starting address 320 is an address following a code flow change—e.g. the target of a jump or call instruction. Hash zone 310 may have a predetermined extent, e.g. 16 bytes, for all signatures. Hash zone 310 may form an index of the database entry of safe code signature 300.

In some embodiments, system emulator 82 compares a safe-code signature database entry to the data at a current emulation address in two steps: in a first step, a predetermined number of bytes (e.g. 16 bytes) in virtual memory starting at the current address is processed by a predetermined hash function and checked against all signature hashes stored in safe code signature database 88. If no match is found, the search process stops. If a hash match is found, system emulator 82 compares the pre-hash and post-hash zones of the matching signature(s) to corresponding bitmasked pre-hash and post-hash zones preceding and subsequent to the current address in virtual memory. System emulator 82 retrieves the sizes of pre-hash zone 310 and post-hash zone 318 from database 88, as well a bitmask for each zone. The bitmask of each zone defines a subset of bits to be used for comparison. For example, address fields and/or other fields may not be useful or necessary to uniquely identify a given machine code sequence, and such fields may be masked out. A suitable bitmask for a given signature may be chosen by a system designer. System emulator 82 applies the bitmasks to corresponding regions preceding and following the hash-zone in virtual memory, and compares the bitmasked regions to the corresponding pre-hash and post-hash signature zones in database 88.

System emulator 82 is also capable of accessing (reading and updating) a safe-code virtual address cache 90 (FIG. 2) maintained on the real host computer. Each entry in safe-code address cache 90 includes a safe-code virtual memory address as well as an identifier of a corresponding routine selected from acceleration routines 58 and file reconstruction routines 52. Safe-code address cache 90 may be configured in a structure optimized for fast searching using the address field as a search key. In some embodiments, safe-code address cache 90 may include a hash table, with each table entry formed by an address, and each table index formed by a hash value generated by applying a hash function to the address. In some embodiments, safe-code address cache 90 may be configured as a binary tree such as a self-balancing binary search tree. An exemplary self-balancing binary search tree is an AVL (Adelson-Velsky-Landis) tree. In some embodiments, safe-code address cache may also store addresses corresponding to virtual system calls to be handled by virtual system call routines 54, as well as identifiers of the corresponding virtual system call routines 54.

As simulation engine 50 moves through a sequence of addresses holding the data of target file 24, system emulator 82 searches safe code signature database 88 for matches to the data of target file 24. When a safe code signature match is found, the current address is added to safe code address cache 90, and a pre-stored native code acceleration routine 58 or unpacked file reconstruction routine 52 is executed. If an address in acceleration address cache 90 is accessed again during the emulation of target file 24, simulation engine 50 may proceed directly to retrieving and natively executing the corresponding routine, without re-searching for a signature match in database 88.

Figure 4:
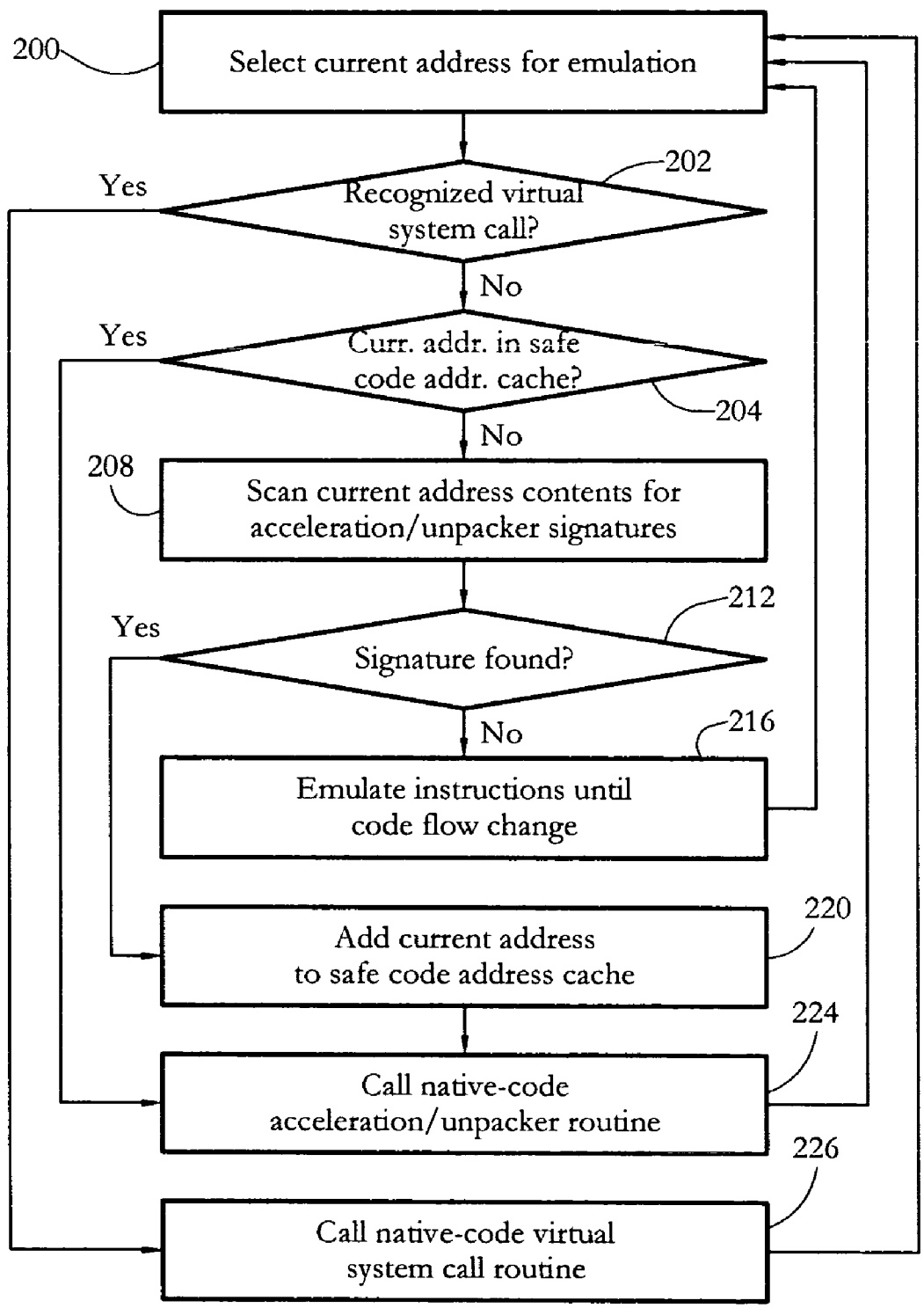
FIG. 4 shows a sequence of steps performed by an emulator of the behavior analyzer of FIG. 2 according to some embodiments of the present invention.

FIG. 4 shows a sequence of steps performed by simulation engine 50 in analyzing target file data at a current virtual memory address according to some embodiments of the present invention. In a step 200, system emulator 82 (FIG. 2) selects a current memory address for emulation. The current memory address holds a part of target file 24, which may include machine code instruction(s) and/or operand(s). Generally, emulation starts at the beginning of target file 24 and proceeds as described below.

In a step 202, system emulator 82 determines whether the current address corresponds to a recognized virtual operating system call. If yes, in a step 226, system emulator 82 calls a corresponding native-code virtual system call routine 54 and does not emulate the virtual system call. System emulator 82 receives the results of the virtual system call from the called routine 54, and selects a new current memory address for emulation (step 200).

In a step 204, system emulator 82 checks whether the current address is present in safe code address cache 90 (FIG. 2). If the current address is present in cache 90, system emulator 82 identifies a native-code acceleration or file reconstruction routine corresponding to the current address and calls that routine (step 224). If the current address is not present in cache 90, system emulator 82 scans the contents of the current address and/or neighboring addresses for matches to acceleration signatures stored in safe code signature database 88 (FIG. 2) (step 208), and determines whether a signature match is found as described above (step 212). If no signature match is found, system emulator 82 continues emulating instructions until a code flow change (step 216). For example, a code flow change occurs upon a jump (conditional or unconditional), call, or interrupt instruction. In some embodiments, system emulator 82 performs step 204 selectively only after each code flow change. If a matching signature is found, system emulator 82 adds the current address to safe code address cache 90, together with an identifier of a native code routine corresponding to the signature (step 220), and calls the corresponding native code routine (step 224).

If the native code routine is a file reconstruction routine 52 (FIG. 2), system emulator 82 continues execution and does not wait for results from the file reconstruction routine 52. The selected file reconstruction routine 52 reconstructs a real file from the virtual memory contents received from system emulator 82, and sends the resulting file to file-based pattern-matching module 68. File-based pattern-matching module 68 performs a content-based scan on the received data and generates a scan result/malware indicator 38.

If the native code routine is an acceleration routine 58 (FIG. 2), system emulator 82 suspends execution until acceleration routine 58 returns its results and a new current address for system emulator 82. The called routine executes a sequence of pre-defined native code instructions. Upon finishing execution, the called acceleration routine 58 returns to system emulator 82 the results of its execution and a new current address for system emulator 82. System emulator 82 uses the results returned by the acceleration routine to update its virtual registers and memory.

Memory-based pattern matching module 62 examines the contents of the virtual memory controlled by virtual memory manager 94 as simulation engine 50 proceeds, and generates a scan result/malware indicator 38. In some embodiments, memory-based pattern matching module 62 examines the virtual memory contents upon every code flow change, every time a virtual process terminates within system emulator 82, and at the end of the emulation process for target file 24.

Virtual machine content inspector module 64 examines the contents of virtual hard drive 96 and the virtual memory controlled by virtual memory manager 94 when the emulation of target file 24 is completed. Content inspector module 64 performs a behavior-based detection of maliciousness by determining whether certain behaviors have occurred during emulation. For example, target file 24 may be deemed malicious if any executable dummy file (goat file) on virtual hard drive 96 is modified, or if the memory contents of a specific process (e.g. "explorer.exe") have been modified by another process.

When the emulation of target file 24 is completed, file-based pattern matching module 68 examines the contents of virtual hard drive 96 and any other virtual storage devices of virtual hardware emulator 86 for malware signatures, and generates a scan result/malware indicator 38.

The exemplary systems and methods described above allow accelerating the performance of behavior-based malware scanners employing emulators. Selected known code sequences encountered by the emulator are executed natively using pre-tailored native-code routines functionally implementing the code sequences, rather than emulated. Executing native code may be significantly faster than emulation in a virtual environment. A system designer may manually choose a number of native-code routines (e.g. on the order of tens of routines) that are sufficiently commonly encountered and that are computationally-intensive to emulate. The native-code routines are then placed in a database and searched periodically during the emulation process. According to some embodiments, pre-defined native-code routines are also used to implement virtual environment operating system calls and to reconstruct unpacked files from the contents of the emulator's virtual memory.

It will be clear to one skilled in the art that the above embodiments may be altered in many ways without departing from the scope of the invention. Accordingly, the scope of the invention should be determined by the following claims and their legal equivalents.

What is claimed is:

1. A computer-implemented method to detect malware on a computing system, the method comprising:
    employing a behavior analysis application running on an operating system of the computing system to perform an accelerated emulation of an untrusted computer file by emulating a first code sequence of a plurality of code sequences of the untrusted computer file in a virtual environment; and
    upon identifying a known code sequence in the untrusted computer file, executing outside the virtual environment a native-code routine functionally implementing the known code sequence, wherein the native-code routine comprises a routine selected from a group consisting of a decompression routine, a decryption routine, and a checksum routine; and
    determining whether the untrusted computer file is malicious according to a result of the accelerated emulation.

2. The method of claim 1, wherein the native-code routine comprises a decompression routine.

3. The method of claim 1, wherein the native-code routine comprises a decryption routine.

4. The method of claim 1, wherein the native-code routine comprises a checksum routine.

5. The method of claim 1, further comprising:
    determining whether a current emulation address is a code flow change target address;
    selectively performing a code signature database search if the current emulation address is determined to be a code flow change target address, wherein performing the code signature database search comprises searching a code signature database for a match to a content of the current emulation address to determine whether the content of the current emulation address forms part of the known code sequence.

6. The method of claim 1, wherein identifying the known code sequence comprises comparing a hash of a content of a current emulation address to a set of code signature hashes stored in a code signature database.

7. The method of claim 1, wherein identifying the known code sequence comprises determining whether a current emulation virtual memory address is present in a known-code virtual address cache.

8. The method of claim 1, wherein the behavior analysis application comprises a memory-based pattern matching module configured to examine a virtual memory of the virtual environment at a plurality of time points during said emulating the first instruction sequence, for determining whether the untrusted computer file is malicious.

9. The method of claim 8, wherein the behavior analysis application further comprises a virtual machine content inspector module configured to examine a virtual hard drive and a virtual memory of the virtual environment upon completion of the accelerated emulation, for identifying a result of a malicious behavior of the untrusted computer file during the accelerated emulation.

10. The method of claim 9, wherein the behavior analysis application further comprises a file-based pattern matching module configured to examine a virtual hard drive of the virtual environment for malware signatures upon completion of the accelerated emulation.

11. The method of claim 1, wherein the native code routine is identical to the known code sequence.

12. The method of claim 1, wherein the native code routine is different from the known code sequence.

13. A computer implemented method to detect malware on a computing system, the method comprising:
    upon identifying a known code sequence in an untrusted computer file comprising a plurality of code sequences, executing outside a virtual environment a native code routine functionally implementing the known code sequence, wherein the native-code routine comprises a routine selected from a group consisting of a decompression routine, a decryption routine, and a checksum routine;
    employing a result of said executing the native code routine to emulate in the virtual environment a second code sequence of the untrusted computer file; and
    determining whether the untrusted computer file is malicious according to a result of emulating the second code sequence.

14. A computer implemented method to detect malware on a computing system, the method comprising:
    determining whether a part of a plurality of parts of an untrusted computer file matches a known code signature; and
    in response to determining whether the part of the untrusted computer file matches the known code signature, when the part matches the known code signature, executing outside the virtual environment a preexisting trusted code routine functionally implementing the part, and when the part does not match the known code signature, emulating the part in a virtual machine, wherein the preexisting trusted code routine comprises a routine selected from a group consisting of a decompression routine, a decryption routine, and a checksum routine.

15. A computer system comprising computer hardware programmed to perform the steps of:
employing a behavior analysis application running on an operating system of the computer system to perform an accelerated emulation of an untrusted computer file by
emulating a first code sequence of a plurality of code sequences of the untrusted computer file in a virtual environment; and
upon identifying a known code sequence in the untrusted computer file, executing outside the virtual environment a native-code routine functionally implementing the known code sequence, wherein the native-code routine comprises a routine selected from a group consisting of a decompression routine, a decryption routine, and a checksum routine; and
determining whether the untrusted computer file is malicious according to a result of the accelerated emulation.

16. The system of claim 15, wherein the native-code routine comprises a decompression routine.

17. The system of claim 15, wherein the native-code routine comprises a decryption routine.

18. The system of claim 15, wherein the native-code routine comprises a checksum routine.

19. The system of claim 15, wherein the system is further programmed to perform the steps of:
determining whether a current emulation address is a code flow change target address;
selectively performing a code signature database search if the current emulation address is determined to be a code flow change target address, wherein performing the code signature database search comprises searching a code signature database for a match to a content of the current emulation address to determine whether the content of the current emulation address forms part of the known code sequence.

20. The system of claim 15, wherein identifying the known code sequence comprises comparing a hash of a content of a current emulation address to a set of code signature hashes stored in a code signature database.

21. The system of claim 15, wherein identifying the known code sequence comprises determining whether a current emulation virtual memory address is present in a known-code virtual address cache.

22. A malware detection computer system comprising computer hardware programmed with computer software, comprising:
means for performing an accelerated emulation of an untrusted computer file by
emulating a first code sequence of a plurality of code sequences of the untrusted computer file in a virtual environment; and
upon identifying a known code sequence in the untrusted computer file, executing outside the virtual environment a native-code routine functionally implementing the known code sequence, wherein the native-code routine comprises a routine selected from a group consisting of a decompression routine, a decryption routine, and a checksum routine; and
means for determining whether the untrusted computer file is malicious according to a result of the accelerated emulation.

23. A malware detection computer system comprising computer hardware programmed with computer software, comprising:
an emulator configured to emulate an untrusted computer file comprising a plurality of code sequences in a virtual environment, and to recognize a known code sequence in the untrusted computer file; and
a native-code acceleration routine responsive to the emulator and functionally implementing the known code sequence, wherein the native-code routine comprises a routine selected from a group consisting of a decompression routine, a decryption routine, and a checksum routine;
wherein the emulator calls the native-code acceleration routine upon recognizing the known code sequence, receives a result of an execution of the native-code acceleration routine, and employs the result of the execution to continue an emulation of the untrusted computer file.

24. A non-transitory computer-readable medium encoding instructions which, when executed, cause a computer system to perform the steps of:
perform an accelerated emulation of an untrusted computer file by
emulating a first code sequence of a plurality of code sequences of the untrusted computer file in a virtual environment; and
upon identifying a known code sequence in the untrusted computer file, executing outside the virtual environment a native-code routine functionally implementing the known code sequence, wherein the native-code routine comprises a routine selected from a group consisting of a decompression routine, a decryption routine, and a checksum routine; and
determine whether the untrusted computer file is malicious according to a result of the accelerated emulation.

25. A non-transitory computer-readable medium encoding instructions which, when executed, cause a computer system to perform the steps of:
upon identifying a known code sequence in an untrusted computer file comprising a plurality of code sequences, executing outside a virtual environment a native code routine functionally implementing the known code sequence, wherein the native-code routine comprises a routine selected from a group consisting of a decompression routine, a decryption routine, and a checksum routine;
employing a result of said executing the native code routine to emulate in the virtual environment a second code sequence of the untrusted computer file; and
determining whether the untrusted computer file is malicious according to a result of emulating the second code sequence.

26. A non-transitory computer-readable medium encoding instructions which, when executed, cause a computer system to perform the steps of:
determining whether a part of a plurality of parts of an untrusted computer file matches a known code signature; and
in response to determining whether the part of the untrusted computer file matches the known code signature, when the part matches the known code signature, executing outside the virtual environment a preexisting trusted code routine functionally implementing the part, and when the part does not match the known code signature, emulating the part in a virtual machine, wherein the trusted code routine comprises a routine selected from a group consisting of a decompression routine, a decryption routine, and a checksum routine.

27. A computer-implemented method to detect malware on a computing system, the method comprising:
performing an accelerated emulation of an untrusted computer file by emulating a first code sequence of a plurality of code sequences of the untrusted computer file in a virtual environment; and upon identifying a known code sequence in the untrusted computer file, executing outside the virtual environment a preexisting trusted routine functionally implementing the known code sequence, wherein the trusted routine comprises a routine selected from a group consisting of a decompression routine, a decryption routine, and a checksum routine; and determining whether the untrusted computer file is malicious according to a result of the accelerated emulation.

* * * * *